United States Patent [19]
Malmberg et al.

[11] Patent Number: 5,598,915
[45] Date of Patent: Feb. 4, 1997

[54] BELT WASHER

[75] Inventors: Jonny Malmberg, Redmond; Jon A. Hocker; John R. Strong, both of Kirkland; Donald L. Hogan, Bellevue, all of Wash.

[73] Assignee: Frigoscandia Equipment AG, Helsingborg, Sweden

[21] Appl. No.: 411,674

[22] PCT Filed: Oct. 5, 1992

[86] PCT No.: PCT/SE92/00693

§ 371 Date: Apr. 4, 1995

§ 102(e) Date: Apr. 4, 1995

[87] PCT Pub. No.: WO94/07782

PCT Pub. Date: Apr. 14, 1994

[51] Int. Cl.⁶ .................................................. B65G 45/00
[52] U.S. Cl. ............................................................ 198/495
[58] Field of Search ............................................... 198/495

[56] References Cited

U.S. PATENT DOCUMENTS 2,266,309  12/1941  Cohen.
5,368,650  11/1994  Tanaka et al. ............... 198/495 X
5,372,242  12/1994  McInnes et al. ................. 198/495

FOREIGN PATENT DOCUMENTS 2082133  3/1982  United Kingdom.

*Primary Examiner*—D. Glenn Dayoan
*Attorney, Agent, or Firm*—Browdy and Neimark

[57] ABSTRACT

A conveyor belt washer having a plurality of nozzles (12) for ejecting water jets towards an upper side of a foraminous conveyor belt (5). A tank (2) is positioned under the foraminous conveyor belt for receiving water ejected from the nozzles, the tank having a foraminous top side (17) for separating particles accompanying the water, an outlet opening (16) in a lower part (9) thereof and a ventilating opening in an upper part (8) thereof. The conveyor belt washer further having a pump (24) with an inlet and an outlet (29), and pipings (27, 28) connecting the outlet opening of the tank to the inlet of the pump, and the outlet of the pump to the plurality of nozzles, such that the water is recirculated and air entrained by the water through the foraminous top side of the tank escapes through the ventilating opening thereof.

14 Claims, 3 Drawing Sheets

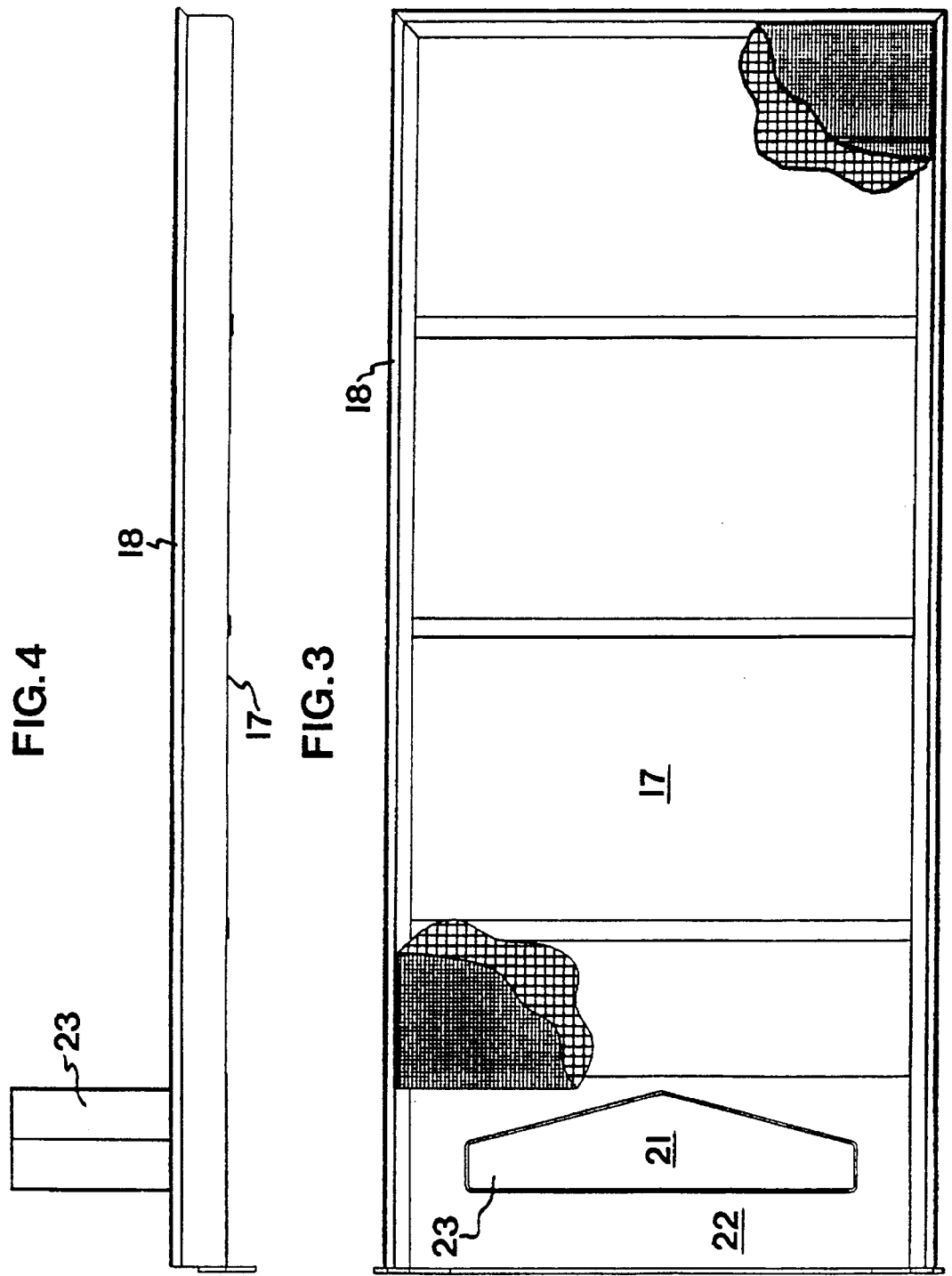

BELT WASHER

FIELD OF THE INVENTION

The present invention relates to a conveyor belt washer for cleaning a foraminous conveyor belt.

DESCRIPTION OF THE RELATED ART

In the food industry, belt conveyors are used for the transportation of food during processing thereof or between separate processing units. This often results in a buildup of food debris and processing media on the conveyor belt, requiring repeated cleaning.

Thorough cleaning of the foraminous conveyor belt with water requires high-pressure water jets which produce splashing water and render the separation of water from food debris difficult. Also, when recirculating the water, air entrained by the water jets causes cavitation in a pump used for producing the high-pressure water jets.

OBJECTS AND SUMMARY OF THE INVENTION

Therefore, one object of the present invention is to provide a conveyor belt washer which eliminates cavitation in the pump for recirculating the water to produce the high-pressure water jets.

Another object of the present invention is to provide a conveyor belt washer capable of effective separation of debris from the cleaning water.

A further object of the present invention is to reduce the splashing of water in a conveyor belt washer.

According to the present invention, a conveyor belt washer comprises a plurality of nozzles for ejecting water jets towards an upper side of a foraminous conveyor belt; a tank positioned under the foraminous conveyor belt for receiving water ejected from said nozzles, said tank having a foraminous top side for separating particles accompanying said water, an outlet opening in a lower part thereof and a ventilating opening in an upper part thereof; a pump having an inlet and an outlet; and pipings connecting said outlet opening of the tank to said inlet of the pump, and said outlet of the pump to said plurality of nozzles, such that the water is recirculated and air entrained by the water through the foraminous top side of the tank escapes through the ventilating opening thereof.

Preferably, the ventilating opening is positioned in the top side of the tank and outside the conveyor belt. Further, in a preferred embodiment, an upstanding channel connects or communicates with the ventilating opening.

The foraminous top side of the tank comprises a filter screen, advantageously a 60 mesh screen having an open area of about 37%. In a preferred embodiment, the filter screen is mounted in a frame which forms a separate unit and is removable from the tank.

In order to allow the conveyor belt to pass along a return path through the belt washer, the tank has an upper compartment and a lower compartment interconnected by a vertical duct on one side of the conveyor belt, said outlet opening being positioned in the lower compartment.

The conveyor belt washer according to the invention further may comprise at least one air curtain after the nozzles in the direction of travel of the conveyor belt.

BRIEF DESCRIPTION OF THE DRAWING

The invention will be described in more detail below, low, reference being had to the accompanying drawings.

FIG. 3 is a top view of a filter included in the conveyor belt washer shown in FIGS. 1 and 2.

FIG. 4 is a side view of the filter shown in FIG. 3.

DETAILED DESCRIPTION OF THE PREFERRED EMBODIMENT

Figure 1:
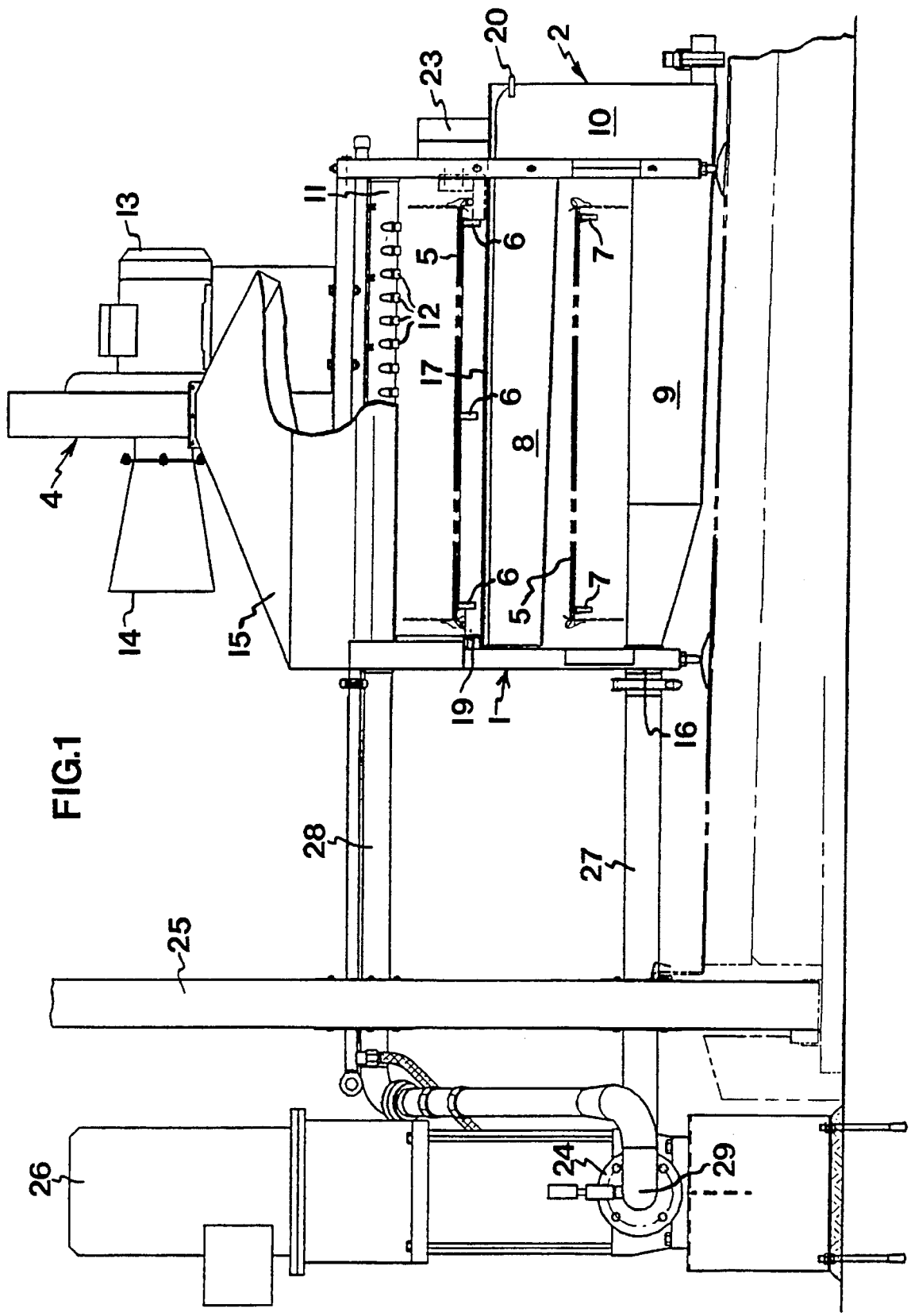
FIG. 1 is a front view of a preferred embodiment of a conveyor belt washer according to the present invention.
Figure 2:
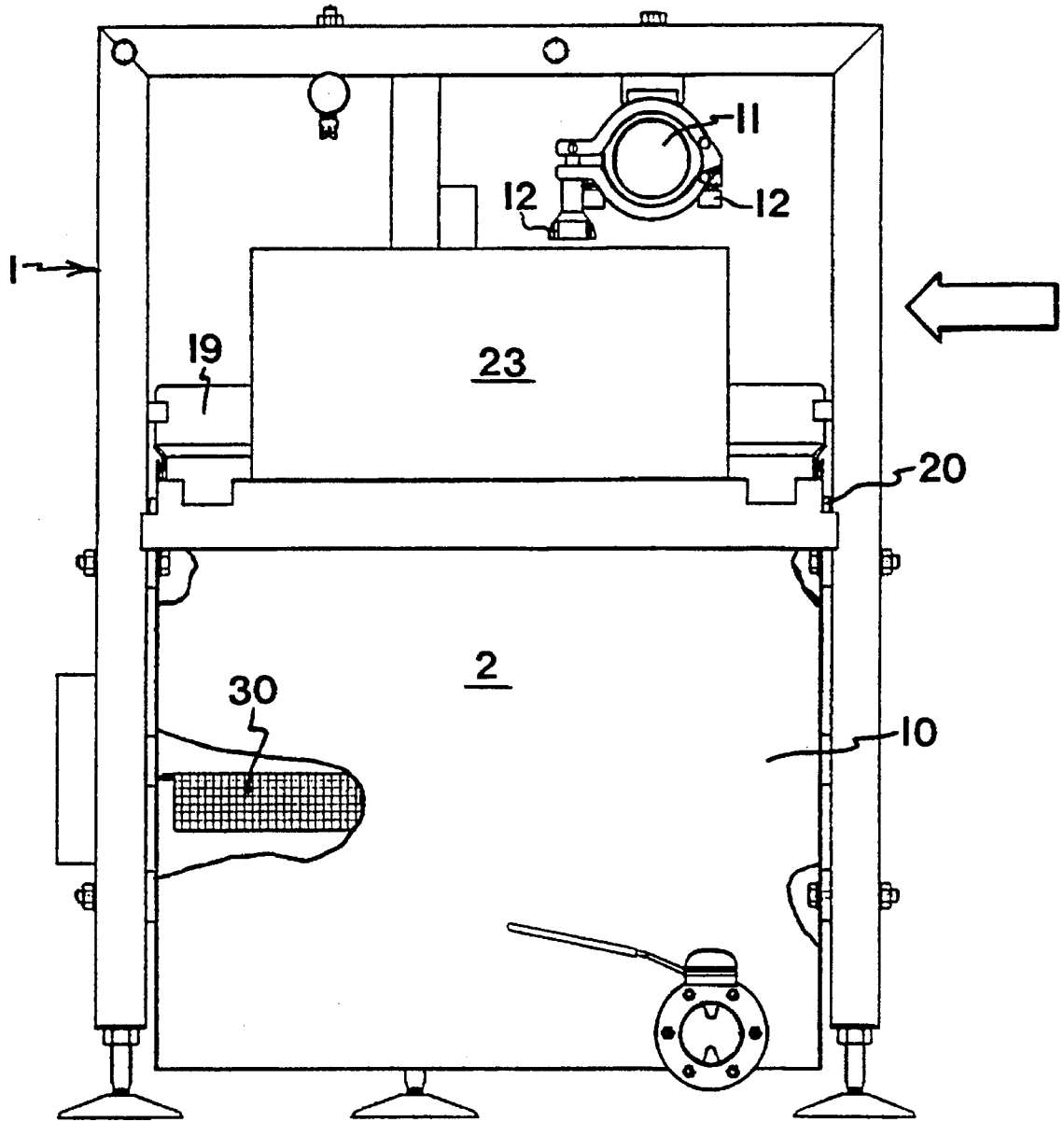
FIG. 2 is a side view of a part of the conveyor belt washer shown in FIG. 1.

Referring now to the drawings, a conveyor belt washer according to the present invention comprises a stand 1 for a tank 2, a spray head 11 and a fan 4. A foraminous conveyor belt 5 travels through the stand 1 along an upper belt path on rails 6. The belt 5 travels in the opposite direction through the stand 1 along a lower belt path on rails 7. In the lower belt path, the foraminous conveyor belt 5 is encompassed by the tank 2, which has an upper compartment 8 and a lower compartment 9 interconnected by a duct 10 outside the foraminous conveyor belt 5 in the lower belt path.

A tubular spray head 11 is mounted in the stand 1 above the foraminous conveyor belt 5 in its upper belt path. The spray head 11 extends over the full width of the foraminous conveyor belt 5 in its upper belt path and has a plurality of nozzles 12 communicating with the interior of the spray head 11 and directed towards an upper side of the foraminous conveyor belt 5 in its upper belt path.

The fan 4 is driven by a fan motor 13 and has a funnel-shaped inlet 14 of circular cross-section, and a funnel-shaped outlet 15 of rectangular cross-section which forms a splash guard. The opening of the fan outlet 15 is directed towards the upper side of the foraminous conveyor belt 5 in its upper path. Also, the fan outlet 15 extends over the full width of the foraminous conveyor belt and is positioned after the spray head 11 in the direction of travel of the foraminous conveyor belt 5 in its upper path.

The lower compartment 9 of the tank 2 is completely closed, except for an outlet opening 16 in its side opposite to its connection with the duct 10.

The top side of the upper compartment 8 is foraminous. More precisely, the top side of the upper compartment 8 is covered by a filter screen 17 mounted in a rectangular frame 18. This frame 18 is slideably received on top of the upper compartment 8 and is, in operation of the conveyor belt washer, fixed by a beam 19 at the end of the upper compartment 8 opposite to the duct 10, and by locking pins 20 at the external side of the duct 10.

As shown in FIG. 3, the filter screen 17 may consist of an upper screen and a lower screen in contact with each other. In a preferred embodiment, the upper screen consists of a 60 mesh screen having an open area of about 37%, and the lower screen consists of a 10 mesh screen having an open area Of about 56%. In that part of the frame 18 which extends outside the foraminous conveyor belt 5 in its upper path, there is a ventilating opening 21 formed in a plate 22. A vertical channel 23 connects with the ventilating opening 21 and is fixed to the plate 22.

A pump 24 is positioned outside a separation wall 25 and has a pump motor 26. Pipings 27, 28 connect the outlet opening 16 of the lower compartment 9 to an inlet of the pump 24 and also connect an outlet 29 of the pump 24 to the tubular spray head 11. The pump 24 is a heavy-duty pump capable of producing a pressure at the outlet 29 of at least 11 bar at a water feed rate of several hundred liters per minute.

The duct 10 comprises a second filter screen 30 in the form of an open box positioned between the upper compartment 8 and the lower compartment 9. When the frame 18 is removed from the conveyor belt washer, the second filter screen 30 may be lifted up through the duct 10 for rinsing.

In operation, water is recirculated by the pump 24 through the pipings 28 and the spray head 3 out of the nozzles 12, such that high-pressure water jets are directed towards the foraminous conveyor belt 5 in its upper belt path and mechanically clean the belt 5. The relatively tight filter screen 17 dissipates a major part of the energy of the water jets and prevents the water from bouncing off the bottom of the upper compartment 8. However, the water jets entrain huge amounts of air into the upper compartment 8. By the arrangement according to the present invention of a ventilating opening 21 in the upper part of the tank 2, these huge amounts of air are allowed to escape, such that the water will reach the outlet opening 16 in the lower compartment 9 in a slow and uniform travelling condition, entraining substantially no air. Thereby, any cavitation in the pump 24 is eliminated. The absence of air in the water reaching the outlet opening 16 thus is a consequence of the ventilating opening 21 and the long distance between the outlet opening 16 and the filter screen 17.

It should be noted that the filter screen 17 is self-cleaning. The self-cleaning mechanism employs water flowing in the opposite direction through the screen to float the debris away to a discharge area situated outside the ventilating channel 23.

It will be seen that the objects hereinbefore set forth may be attained. Since various modifications may be made to the above embodiment of the invention without departing from the scope thereof, it is intended that the above description and accompanying drawings shall be interpreted as illustrative and not in a limiting sense.

What is claimed is:

1. A conveyor belt washer, comprising
   a plurality of nozzles (12) for ejecting water jets towards an upper side of a foraminous conveyor belt (5); a tank (2) positioned under the foraminous conveyor belt for receiving water ejected from said nozzles, said tank having a foraminous top side (17) for separating particles accompanying said water, an outlet opening (16) in a lower part (9) of the tank and a ventilating opening (21) in an upper part (8) of the tank;
   a pump (24) having an inlet and an outlet (29); and
   pipings (27, 28) connecting said outlet opening of the tank to said inlet of the pump, and said outlet of the pump to said plurality of nozzles, such that the water is recirculated and air entrained by the water through the foraminous top side of the tank escapes through the ventilating opening thereof.

2. The conveyor belt washer as claimed in claim 1, wherein the ventilating opening (21) is positioned in the top side of the tank (2).

3. The conveyor belt washer as claimed in claim 1, wherein the upper part of the tank comprises an upper compartment and the lower part of the tank comprises a lower compartment, wherein a vertical duct on one side of the conveyor belt interconnects the upper compartment and the lower compartment, and wherein said outlet opening is positioned in the lower compartment.

4. The conveyor belt washer as claimed in claim 2, wherein the upper part of the tank comprises an upper compartment and the lower part of the tank comprises a lower compartment, wherein a vertical duct on one side of the conveyor belt interconnects the upper compartment and the lower compartment, and wherein said outlet opening is positioned in the lower compartment.

5. The conveyor belt washer as claimed in claim 1, wherein the foraminous top side of the tank (2) comprises a filter screen (17).

6. The conveyor belt washer as claimed in claim 5, wherein the filter screen (17) comprises a 60-mesh screen having an open area of about 37%.

7. The conveyor belt as claimed in claim 1, further comprising a splash guard (15) on the top side of the tank (4) and after the nozzles (12) in the direction of travel of the conveyor belt (5).

8. The conveyor belt washer as claimed in claim 1, wherein the nozzles (12) are positioned in a row across the width of the conveyor belt.

9. The conveyor belt washer as claimed in claim 5, wherein the filter screen (17) is mounted in a frame (18) which is removable from the tank (2).

10. The conveyor belt washer as claimed in claim 3, further comprising a filter screen removably positioned (30) in said vertical duct (10).

11. The conveyor belt washer as claimed in claim 2, wherein the foraminous top side of the tank (2) comprises a filter screen (17).

12. A conveyor belt washer, comprising
    a plurality of nozzles (12) for ejecting water jets towards an upper side of a foraminous conveyor belt (5);
    a tank (2) positioned under the foraminous conveyor belt for receiving water ejected from said nozzles, said tank having a foraminous top side (17) for separating particles accompanying said water, an outlet opening (16) in a lower part (9) of the tank and a ventilating opening (21) in an upper part (8) of the tank;
    a pump (24) having an inlet and an outlet (29); and
    pipings (27, 28) connecting said outlet opening of the tank to said inlet of the pump, and said outlet of the pump to said plurality of nozzles, such that the water is recirculated and air entrained by the water through the foraminous top side of the tank escapes through the ventilating opening thereof;
    wherein the ventilating opening (21) is positioned in the top side of the tank (2); and
    wherein the ventilating opening (21) is positioned outside the conveyor belt (5).

13. The conveyor belt washer as claimed in claim 3, wherein the ventilating opening (21) connects with an upstanding channel (23).

14. A conveyor belt washer, comprising
    a plurality of nozzles (12) for ejecting water jets towards an upper side of a foraminous conveyor belt (5);
    a tank (2) positioned under the foraminous conveyor belt for receiving water ejected from said nozzles, said tank having a foraminous top side (17) for separating particles accompanying said water, an outlet opening (16) in a lower part (9) of the tank and a ventilating opening (21) in an upper part (8) of the tank;
    a pump (24) having an inlet and an outlet (29); and
    pipings (27, 28) connecting said outlet opening of the tank to said inlet of the pump, and said outlet of the pump to said plurality of nozzles, such that the water is recirculated and air entrained by the water through the foraminous top side of the tank escapes through the ventilating opening thereof; and
    further comprising means (4, 15) for establishing at least one air curtain after the nozzles (12) in the direction of travel of the conveyor belt (5).

* * * * *